United States Patent
Tsunoda et al.

(10) Patent No.: US 9,879,890 B2
(45) Date of Patent: Jan. 30, 2018

(54) AIR CONDITIONER FOR VEHICLE

(71) Applicant: HONDA MOTOR CO., LTD., Minato-Ku, Tokyo (JP)

(72) Inventors: Isao Tsunoda, Haga-Gun (JP); Kazuma Ichikawa, Haga-Gun (JP)

(73) Assignee: Honda Motor Co., Ltd., Tokyo (JP)

(*) Notice: Subject to any disclaimer, the term of this patent is extended or adjusted under 35 U.S.C. 154(b) by 638 days.

(21) Appl. No.: 13/781,890

(22) Filed: Mar. 1, 2013

(65) Prior Publication Data
US 2013/0227984 A1 Sep. 5, 2013

(30) Foreign Application Priority Data
Mar. 5, 2012 (JP) ................................. 2012-048313

(51) Int. Cl.
*F25B 30/02* (2006.01)
*B60H 1/00* (2006.01)
(Continued)

(52) U.S. Cl.
CPC .......... *F25B 30/02* (2013.01); *B60H 1/00785* (2013.01); *B60H 1/00885* (2013.01); (Continued)

(58) Field of Classification Search
CPC ........ B60H 1/00921; B60H 2001/3285; B60H 1/3213; B60H 2001/006; B60H 1/00899; (Continued)

(56) References Cited

U.S. PATENT DOCUMENTS 5,615,560 A 4/1997 Inoue
6,073,459 A * 6/2000 Iritani .................. B60H 1/3205
62/204
(Continued)

FOREIGN PATENT DOCUMENTS

CN 101547803 A 9/2009
DE 10 2010 035740 A1 3/2012
(Continued)

OTHER PUBLICATIONS

Machine translation of JP2012-30734.*
(Continued)

*Primary Examiner* — Jianying Atkisson
*Assistant Examiner* — Meraj A Shaikh
(74) *Attorney, Agent, or Firm* — Carrier Blackman & Associates, P.C.; Joseph P. Carrier; Anne G. Sabourin (57) ABSTRACT

When a dehumidifying heating operation is performed by a heat-radiating operation of the interior condenser and a heat-absorbing operation of the exterior heat-exchanger and the evaporator, a control device of an air conditioner for vehicle decreases the valve opening degree of the electronic expansion valve to be equal to or less than a predetermined opening degree before opening the solenoid valve for dehumidification in a closed state, opens the solenoid valve for dehumidification after decreasing the valve opening degree of the electronic expansion valve to be equal to or less than the predetermined opening degree, and then increasing the valve opening degree of the electronic expansion valve to be greater than the predetermined opening degree after opening the solenoid valve for dehumidification.

2 Claims, 5 Drawing Sheets (51) Int. Cl.
*B60H 3/02* (2006.01)
*B60H 1/32* (2006.01)

(52) U.S. Cl.
CPC ......... *B60H 1/00921* (2013.01); *B60H 3/024* (2013.01); *B60H 2001/3247* (2013.01); *B60H 2001/3285* (2013.01)

(58) Field of Classification Search
CPC ............... B60H 1/3207; F25B 2500/26; F25B 2600/2513; F25B 41/04; F25B 2313/023; F25B 2313/02343
USPC ..... 62/498, 228.4, 90, 160, 197, 222, 324.6, 62/228.3; 236/92 B, 44 A, 93 A
See application file for complete search history.

(56) References Cited

U.S. PATENT DOCUMENTS

| | | | |
|---|---|---|---|
| 2003/0074914 A1* | 4/2003 | Hirakanu | F25B 13/00 62/324.6 |
| 2008/0028779 A1* | 2/2008 | Song | F25B 41/062 62/190 |
| 2009/0288434 A1* | 11/2009 | Lou | F25B 41/062 62/222 |

FOREIGN PATENT DOCUMENTS

| | | |
|---|---|---|
| EP | 2299205 A1 | 3/2011 |
| FR | 2958019 A1 | 9/2011 |
| JP | 11-254957 A | 9/1999 |
| JP | 2011-240725 A | 12/2011 |
| JP | 2012-30734 * | 2/2012 |
| JP | 2012030734 A * | 2/2012 |

OTHER PUBLICATIONS

Extended European Search Report, dated Sep. 27, 2013, issued in corresponding European Patent Application.
Chinese Office Action, and partial English translation thereof, dated Dec. 3, 2014, issued over the corresponding CN Patent Application 201310082559.9.
Notice of Allowance issued in corresponding Japanese Patent Application 2012-048313, dated Nov. 26, 2013.

* cited by examiner

AIR CONDITIONER FOR VEHICLE

CROSS-REFERENCE TO RELATED APPLICATION

Priority is claimed on Japanese Patent Application No. 2012-048313, filed on Mar. 5, 2012, the content of which is incorporated herein by reference.

BACKGROUND

Field of the Invention

The present invention relates to an air conditioner for vehicle.

Description of Related Art

In an air conditioner of the related art performing a dehumidifying heating operation by a heat pump cycle, when a heat-exchange medium in a gas phase state is decompressed and expanded by decompression means (a capillary tube), the flowing sound increases. Therefore, for example, a method in which a refrigerant flow passage (an auxiliary bypass pipe) is provided for circulating a refrigerant (a bypass medium which bypasses through an auxiliary expansion valve) capable of cooling the heat-exchange medium in advance prior to the decompression and expansion, and in which an opening of a valve (the auxiliary expansion valve) which sets the amount of refrigerant to be introduced to the refrigerant flow passage is increasingly changed as the temperature of the heat-exchange medium increases has been known (see Japanese Unexamined Patent Application, First Publication No. H11-254957, for example).

SUMMARY

In the method according to the related art described above, it is necessary to newly add the refrigerant flow passage for circulating the refrigerant capable of cooling the heat-exchange medium in advance and the valve for setting the amount of refrigerant to be introduced to the refrigerant flow passage. Therefore, there is a problem in that an apparatus configuration is complicated and the expense necessary for the apparatus configuration increases.

Furthermore, for example, in the air conditioner performing a dehumidifying heating operation by a heat pump cycle, in the case of an apparatus configuration where t heat-exchange medium may rapidly flow into an evaporator due to switching the flow passage of the heat-exchange medium when a heating operation or a cooling operation is shifted to the dehumidifying heating operation, there is a concern that the flowing sound may be increased. Therefore, there is a demand to suppress an increase in the flowing sound and appropriately switch the operations.

An aspect according to the invention has been made under such circumstances, and an object thereof is to provide an air conditioner for vehicle capable of suppressing an increase in flowing sound of a heat-exchange medium and appropriately switching operations.

An aspect according to the present invention includes the following means for achieving the object related to solving the problems.

An air conditioner for vehicle according to claim 1 of the invention includes: a compressor that compresses and outputs a heat-exchange medium; an interior condenser that is able to radiate heats using the heat-exchange medium which is output from the compressor after being compressed; an exterior heat-exchanger that exchanges heat between the heat-exchange medium flowing out from the interior condenser and an atmosphere outside of a vehicle cabin; an electronic expansion valve that decompresses, expands and outputs the heat-exchange medium; an interior heat-exchanger that exchanges heat between the heat-exchange medium, which is output from the electronic expansion valve after being decompressed and expanded, and an atmosphere inside of the vehicle cabin; a first flow passage that connects the interior condenser and the exterior heat-exchanger; a second flow passage that is branched from the first flow passage and connected to the electronic expansion valve; a solenoid valve for dehumidification that is provided in the second flow passage and controlled to be opened or closed; and a control device that controls a valve opening degree of the electronic expansion valve and for controlling opening or closing of the solenoid valve for dehumidification, in which, when a dehumidifying heating operation is performed by a heat-radiating operation of the interior condenser and a heat-absorbing operation of the exterior heat-exchanger and the interior heat-exchanger, the control device reduces the valve opening degree of the electronic expansion valve to be equal to or less than a predetermined opening degree before opening the solenoid valve for dehumidification in a closed state, opens the solenoid valve for dehumidification after decreasing the valve opening degree of the electronic expansion valve to be equal to or less than the predetermined opening degree, and then increases the valve opening degree of the electronic expansion valve to be greater than the predetermined opening degree after opening the solenoid valve for dehumidification.

According to the above aspect, when, during an dehumidifying heating operation, the heat-exchange medium flowing out from the interior condenser is branched into and circulated through the exterior heat-exchanger and the interior heat-exchanger, it is possible to prevent the heat-exchange medium flowing out from the interior condenser from rapidly flowing into the interior heat-exchanger after being circulated through the solenoid valve for dehumidification and the electronic expansion valve.

Thereby, it is possible to suppress an increase in flowing sound of the heat-exchange medium in the interior heat-exchanger and to appropriately switch an operation from an operation (heating operation or cooling operation, for example) where the solenoid valve for dehumidification is in a closed state to the dehumidifying heating operation where the solenoid valve for dehumidification is in a opened state.

DESCRIPTION OF THE EMBODIMENT

Hereinafter, an air conditioner for vehicle according to an embodiment of the invention will be described with reference to the accompanying drawings.

Figure 1:
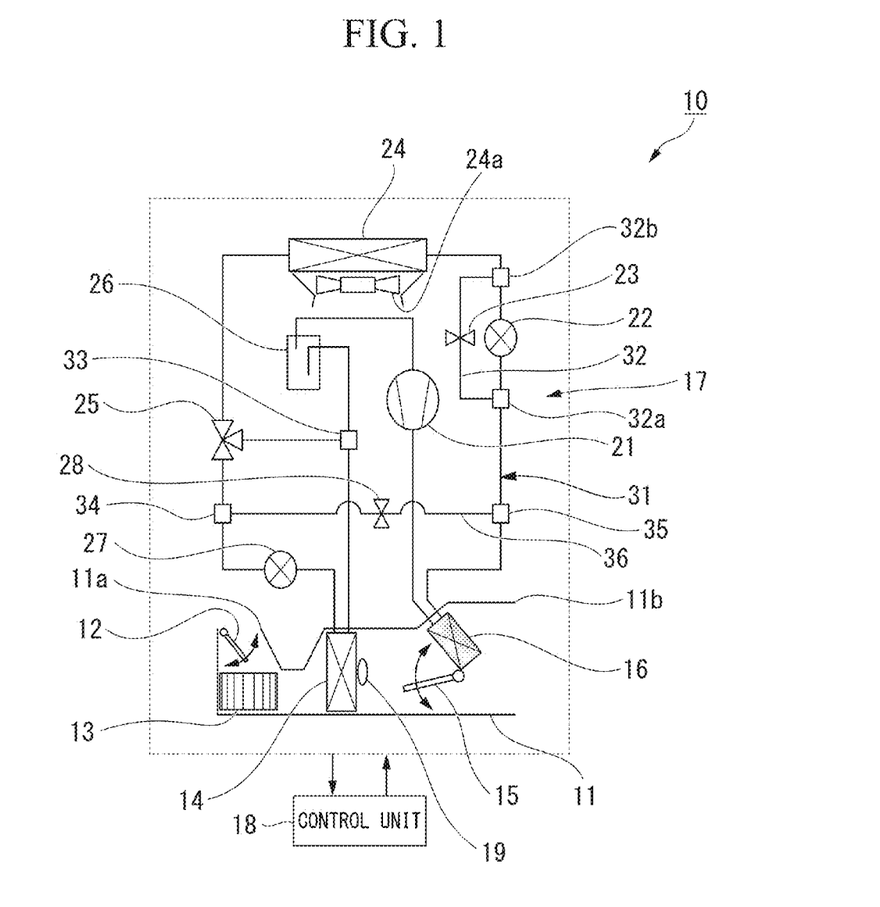
FIG. 1 shows the configuration of an air conditioner for vehicle according to an embodiment of the invention.

An air conditioner for vehicle 10 according to the embodiment is mounted on, for example, an electric vehicle which is not equipped with an internal-combustion engine as a drive source thereof. The air conditioner for vehicle 10 is an air conditioner capable of performing a dehumidifying heating operation by a heat pump cycle, and is configured by including an inlet opening/closing door 12, an air blower 13, an evaporator (interior heat-exchanger) 14, a damper 15 and an interior condenser 16 in a sequence from an air inlet 11a provided on an upstream side of a ventilation duct 11 toward an air outlet 11b provided on a downstream side thereof, as shown in FIG. 1.

In addition, the air conditioner for vehicle 10 is configured by including a heat pump cycle 17 which has the evaporator 14 and the interior condenser 16, a control unit (control device) 18 and an evaporator sensor 19.

The air inlet 11a of the ventilation duct 11 is provided to enable internal air (in-cabin air) and external air (out-cabin air) to be introduced to the inside of the air conditioner for vehicle 10.

The air outlet 11b of the ventilation duct 11 is provided to be able to blow air from the inside of the air conditioner for vehicle 10 to a vehicle cabin.

The inlet opening/closing door 12 is controlled to be opened or closed by the control of the control unit 18, for example, and is provided to be able to change the amount of internal air (in-cabin air) and external air (out-cabin air) introduced to the inside of the ventilation duct 11.

The air blower 13 is driven corresponding to the driving voltage applied by the control of the control unit 18, for example, and blows the air (internal air and external air) which has been introduced from the air inlet 11a, from the upstream side of the ventilation duct 11 toward the air outlet 11b on the downstream side, namely toward the evaporator 14 and the interior condenser 16.

The evaporator (interior heat-exchanger) 14 exchanges heat between the low-pressure heat-exchange medium flowing therein and an atmosphere (air) in a vehicle cabin, and cools the air passing through the evaporator 14 in the ventilation duct 11, for example, using the heat absorption due to the evaporation of the heat-exchange medium.

The damper 15 can be pivoted by a motor (not shown) driven by the control from the control unit 18, for example. Also, the damper 15 adjusts the air volume ratio, by manipulating the opening (opening with respect to the air passage toward the interior condenser 16, for example), between the air volume to be introduced into the interior condenser 16 and the air volume bypassing the interior condenser 16 to be exhausted to the vehicle cabin, among the air volume of the air passing through the evaporator 14 by means of the air blower 13.

The interior condenser 16 is able to radiate heat by the high-temperature and high-pressure heat-exchange medium flowing therein, and, for example, heats the air introduced into the interior condenser 16 in the ventilation duct 11.

The heat pump cycle 17 is configured by including, for example, a compressor 21, the interior condenser 16, a throttle valve for heating 22, a solenoid valve for heating 23, an exterior heat-exchanger 24, a three-way valve 25, a gas-liquid separator 26, an electronic expansion valve 27 and a solenoid valve for dehumidification 28.

The compressor 21 is driven by, for example, a driving force of a motor (not shown) which is driven by the control of the control unit 18. The compressor 21 suctions the heat-exchange medium having a gas phase from the gas-liquid separator 26, and compresses the heat-exchange medium. Then, the compressor 21 discharges the high-temperature and high-pressure heat-exchange medium to the interior condenser 16.

The interior condenser 16 is connected to the exterior heat-exchanger 24 by a first flow passage 31. The throttle valve for heating 22 and the solenoid valve for heating 23 are disposed between the interior condenser 16 and the exterior heat-exchanger 24 of the first flow passage 31.

The throttle valve for heating 22 is a so-called expansion valve. The throttle valve for heating 22 expands the heat-exchange medium exhausted from the interior condenser 16 and then discharges the low-temperature and low-pressure heat-exchange medium in an atomized state to the exterior heat-exchanger 24.

The solenoid valve for heating 23 is provided on a bypass flow passage 32 and controlled to be opened or closed by the control unit 18, for example. Between the interior condenser 16 and the exterior heat-exchanger 24, the bypass flow passage 32 bypasses the throttle valve for heating 22 via a first branch pipe 32a on the interior condenser 16 side and a second branch pipe 32b on the exterior heat-exchanger 24 side.

For example, the solenoid valve for heating 23 is in a closed state during the heating operation or the dehumidifying heating operation, and is in an opened state during the cooling operation.

Thereby, during the heating operation or the dehumidifying heating operation, for example, the heat-exchange medium exhausted from the interior condenser 16 passes through the throttle valve for heating 22, and then flows in the exterior heat-exchanger 24 in a low-temperature and low-pressure state.

Meanwhile, during the cooling operation, the heat-exchange medium exhausted from the interior condenser 16 passes through the solenoid valve for heating 23, and then flows in the exterior heat-exchanger 24 in a high-temperature state.

The exterior heat-exchanger 24 is, for example, an outside condenser, and exchanges heat between the heat-exchange medium flowing therein and an atmosphere (air) outside of the vehicle cabin.

For example, during the heating operation or the dehumidifying heating operation, the exterior heat-exchanger 24 is able to absorb heat from the atmosphere outside of the vehicle cabin using the low-temperature and low-pressure heat-exchange medium flowing therein. The exterior heat-exchanger 24 increases the temperature of the heat-exchange medium by absorbing heat from the atmosphere outside of the vehicle cabin, for example.

On the other hand, during the cooling operation, the exterior heat-exchanger 24 is able to radiate heat to the atmosphere outside of the vehicle cabin using the high-temperature heat-exchange medium flowing therein. The exterior heat-exchanger 24 cools the heat-exchange medium by radiating heat to the atmosphere outside of the vehicle cabin and the blowing air using a condenser fan 24a, for example.

The three-way valve 25 is connected to the exterior heat-exchanger 24, a confluent pipe 33 on the gas-liquid separator 26 side and a third branch pipe 34 on the electronic expansion valve 27 side and is controlled to be switched by the control unit 18, for example, so that the heat-exchange medium flowing out from the exterior heat-exchanger 24 is discharged to the gas-liquid separator 26 or the electronic expansion valve 27 in a switching manner.

During the heating operation or the dehumidifying heating operation, the three-way valve 25 discharges the heat-exchange medium flowing out from the exterior heat-exchanger 24 to an inflow port (not shown) of the confluent pipe 33 on the gas-liquid separator 26 side, for example.

On the other hand, during the cooling operation, the three-way valve 25 discharges the heat-exchange medium flowing out from the exterior heat-exchanger 24 to the third branch pipe 34 on the electronic expansion valve 27 side.

The gas-liquid separator 26 is connected between an outflow port (not shown) of the confluent pipe 33 and an intake port (not shown) of the compressor 21. The gas-liquid separator 26 separates gas and liquid of the heat-exchange medium flowing out from the outflow port of the confluent pipe 33, and then introduces the heat-exchange medium having a gas phase to the compressor 21.

The electronic expansion valve 27 is connected between the third branch pipe 34 and an inflow port (not shown) of the evaporator 14. Corresponding to the valve opening degree controlled by the control unit 18, for example, the electronic expansion valve 27 expands the heat-exchange medium flowing out from the third branch pipe 34, and then discharges the low-temperature and low-pressure heat-exchange medium having two phases, namely gas and liquid, in an atomized state to the evaporator 14.

The evaporator 14 is connected between the electronic expansion valve 27 and the confluent pipe 33, and includes an inflow port (not shown) connected to the third branch pipe 34 and an outflow port (not shown) connected to the inflow port (not shown) of the confluent pipe 33.

The solenoid valve for dehumidification 28 is provided on a second flow passage 36 and controlled to be opened or closed by the control unit 18, for example. The second flow passage 36 is branched from the first flow passage 31 by a fourth branch pipe 35 provided between the interior condenser 16 and the first branch pipe 32a of the first flow passage 31, and is connected to the third branch pipe 34.

The solenoid valve for dehumidification 28 is in a closed state during the heating operation or the cooling operation, and is in an opened state during the dehumidifying heating operation, for example.

Thereby, for example, during the heating operation or the cooling operation, the heat-exchange medium exhausted from the interior condenser 16 is circulated only through the first flow passage 31 and passes through the fourth branch pipe 35 toward the exterior heat-exchanger 24.

On the other hand, during the dehumidifying heating operation, the heat-exchange medium exhausted from the interior condenser 16 is branched into two flows of the first flow passage 31 and the second flow passage 36 in the fourth branch pipe 35. In one flow thereof, the heat-exchange medium is circulated through the first flow passage 31 and flows toward the exterior heat-exchanger 24. In the other flow, the heat-exchange medium is circulated through the second flow passage 36 where passing through the solenoid valve for dehumidification 28 and the third branch pipe 34, and flows toward the electronic expansion valve 27.

Based on, for example, a command signal input by, for example, an operator via an appropriate switch (not shown) or the like, or a signal of detection results output from the evaporator sensor 19, the control unit 18 controls the operation of the air conditioner for vehicle 10 to switch between the heating operation, the cooling operation and the dehumidifying heating operation.

The evaporator sensor 19 is disposed at the position on a downstream side of the evaporator 14 in the ventilation duct 11. The evaporator sensor 19 detects the temperature of the air passing through the evaporator 14 and then outputs the signal of the detection results to the control unit 18.

The air conditioner for vehicle 10 according to the embodiment has the above-described configuration. Next, an operation of the air conditioner for vehicle 10 will be described.

Figure 2A:
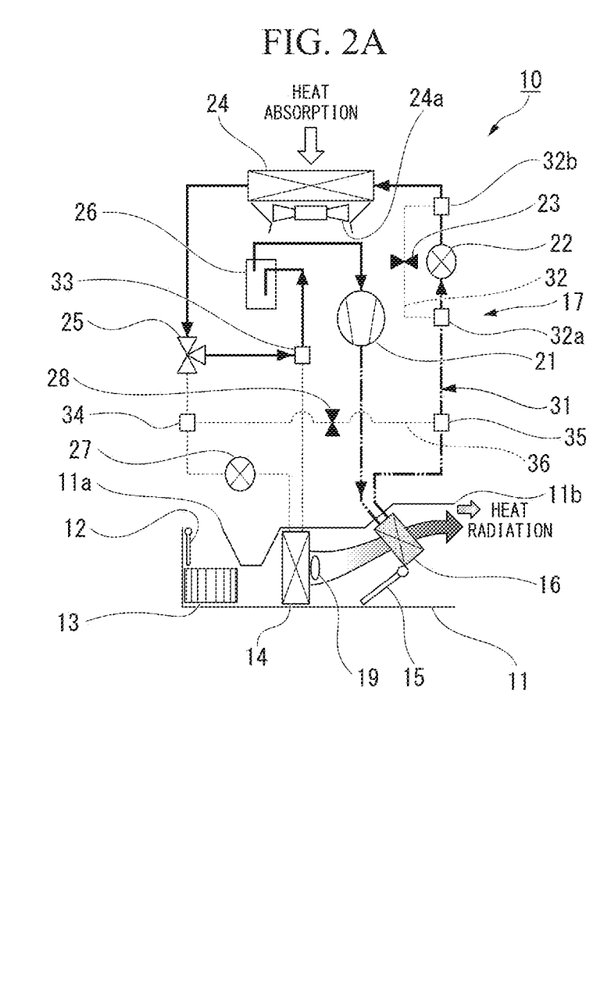
FIG. 2A shows a state of a heating operation of the air conditioner for vehicle according to the embodiment of the invention.

First, during the heating operation of the air conditioner for vehicle 10, the damper 15 is opened so as to introduce the air passing through the evaporator 14 into the interior condenser 16, as shown in FIG. 2A, for example. Also, the solenoid valve for heating 23 and the solenoid valve for dehumidification 28 are closed, and the three-way valve 25 connects the exterior heat-exchanger 24 to the inflow port of the confluent pipe 33.

Thereby, the high-temperature and high-pressure heat-exchange medium discharged from the compressor 21 heats the air in the ventilation duct 11 by radiating heat in the interior condenser 16.

Then, the heat-exchange medium is expanded by the throttle valve for heating 22 so as to be in an atomized state having a low temperature and low pressure. Subsequently, the heat-exchange medium absorbs heat from the atmosphere outside of the vehicle cabin in the exterior heat-exchanger 24 and becomes in an atomized state having gas and liquid. Next, the heat-exchange medium having two phases passes through the three-way valve 25 and the confluent pipe 33 and flows in the gas-liquid separator 26.

Then, the gas-liquid separator 26 separates gas and liquid for the heat-exchange medium, and the compressor 21 suctions the heat-exchange medium having a gas phase.

Figure 2B:
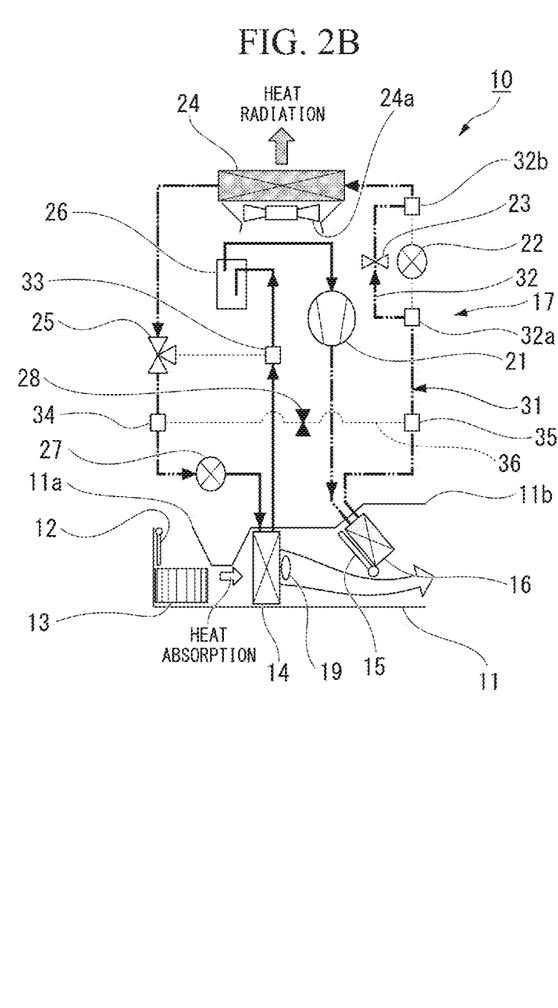
FIG. 2B shows a state of a cooling operation of the air conditioner for vehicle according to the embodiment of the invention.

Additionally, during the cooling operation of the air conditioner for vehicle 10, the damper 15 is closed so as to make the air passing through the evaporator 14 bypass the interior condenser 16, as shown in FIG. 2B, for example. Also, the solenoid valve for heating 23 is opened and the solenoid valve for dehumidification 28 is closed. The three-way valve 25 connects the exterior heat-exchanger 24 to the third branch pipe 34.

Thereby, the high-temperature and high-pressure heat-exchange medium discharged from the compressor 21 passes through the interior condenser 16 and the solenoid valve for heating 23 and radiates heat to the atmosphere outside of the vehicle cabin in the exterior heat-exchanger 24. Then, the heat-exchange medium passes through the three-way valve 25 and the third branch pipe 34 and flows in the electronic expansion valve 27.

Subsequently, the heat-exchange medium is expanded by the electronic expansion valve 27 so as to be in an atomized state having a low temperature and low pressure. Next, the heat-exchange medium cools the air in the ventilation duct 11 by absorbing heat in the evaporator 14.

Then, the heat-exchange medium passes through the confluent pipe 33 and flows in the gas-liquid separator 26. The gas-liquid separator 26 separates gas and liquid of the heat-exchange medium, and the compressor 21 suctions the heat-exchange medium having a gas phase.

Figure 3:
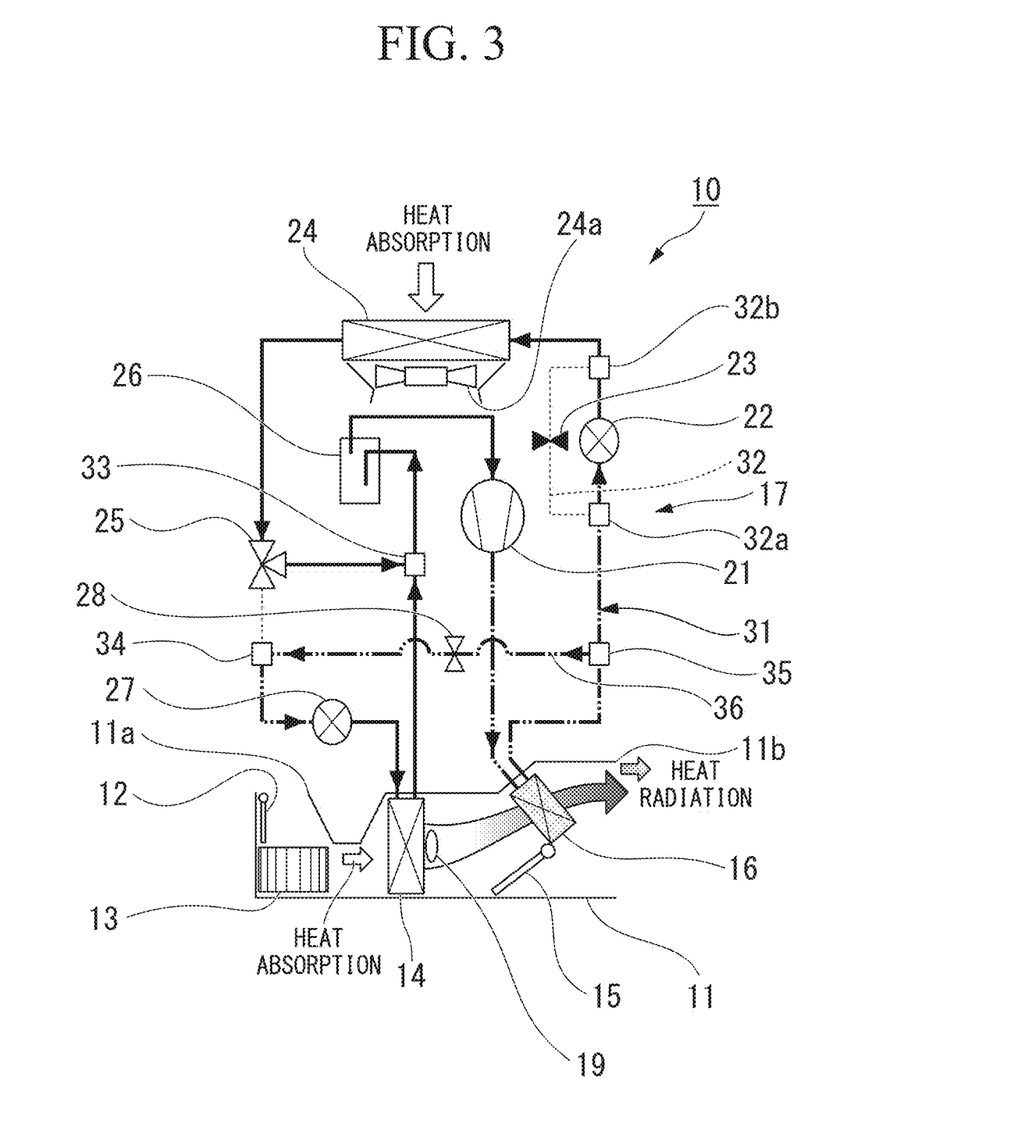
FIG. 3 shows the state of a dehumidifying heating operation of the air conditioner for vehicle according to the embodiment of the invention.

Furthermore, during the dehumidifying heating operation of the air conditioner for vehicle 10, the damper 15 is opened so as to introduce the air passing through the evaporator 14 into the interior condenser 16, as shown in FIG. 3, for example. Also, the solenoid valve for heating 23 is closed and the solenoid valve for dehumidification 28 is opened. In addition, the three-way valve 25 connects the exterior heat-exchanger 24 to the inflow port of the confluent pipe 33.

Thereby, the high-temperature and high-pressure heat-exchange medium discharged from the compressor 21 heats the air (that is, the air passing through the evaporator 14) in the ventilation duct 11 by radiating heat in the interior condenser 16.

Then, the heat-exchange medium is branched into two flows of the first flow passage 31 and the second flow passage 36 in the fourth branch pipe 35. In one flow thereof, the heat-exchange medium is circulated through the first flow passage 31 and flows toward the exterior heat-exchanger 24. In the other flow, the heat-exchange medium is circulated through the second flow passage 36 where passing through the solenoid valve for dehumidification 28 and the third branch pipe 34, and flows toward the electronic expansion valve 27.

In other words, the heat-exchange medium in the one flow flows in the throttle valve for heating 22 from the fourth branch pipe 35, and then being expanded by the throttle valve for heating 22 so as to be in an atomized state having a low temperature and low pressure. Next, the heat-exchange medium absorbs heat from the atmosphere outside of the vehicle cabin in the exterior heat-exchanger 24 and becomes in an atomized state having gas and liquid. Subsequently, the heat-exchange medium having two phases passes through the three-way valve 25 and the confluent pipe 33 and flows in the gas-liquid separator 26.

Furthermore, the heat-exchange medium in the other flow flows in the electronic expansion valve 27 from the fourth branch pipe 35, and then being expanded by the electronic expansion valve 27 so as to be in an atomized state having a low temperature and low pressure. Next, the heat-exchange medium cools the air in the ventilation duct 11 to a dew point through absorbing heat in the evaporator 14, thereby performing dehumidification. Then, the heat-exchange medium in a gas-liquid two phased state passes through the confluent pipe 33 and flows in the gas-liquid separator 26.

Hereinafter, a process of switching an operation of the air conditioner for vehicle 10 from the stopped state or the state of executing the operation other than the dehumidifying heating operation, such as the heating operation or the cooling operation, to the state of executing the dehumidifying heating operation will be described.

Figure 4:
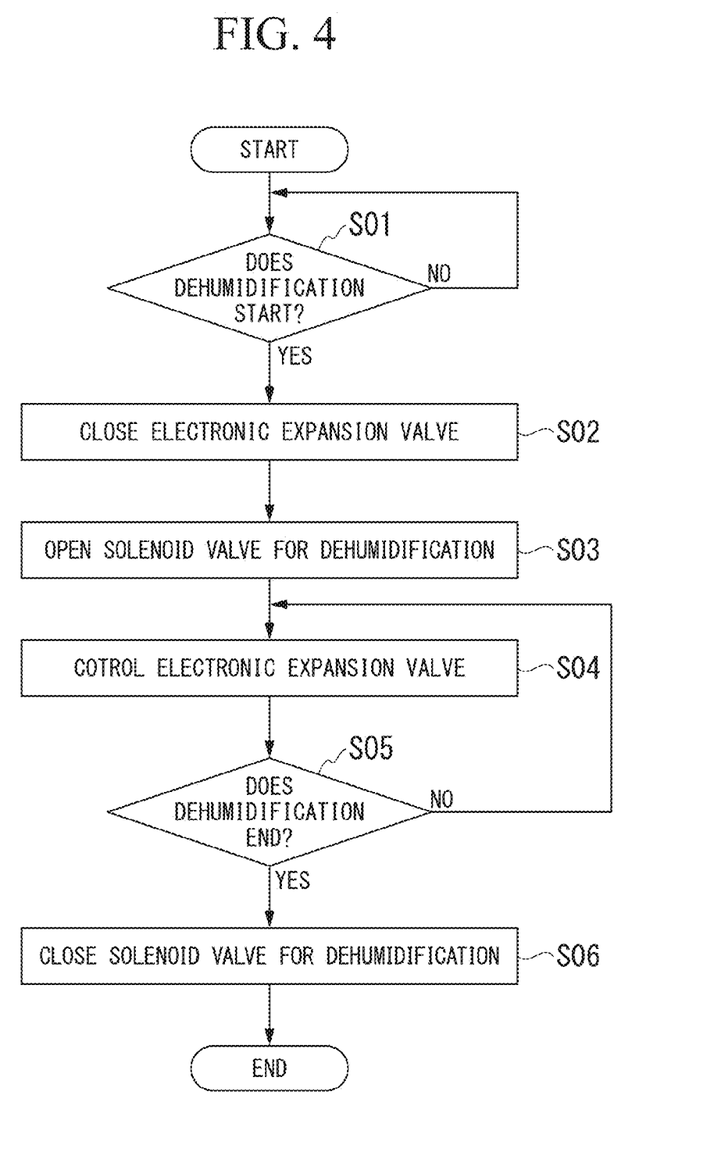
FIG. 4 is a flow chart showing a process of the dehumidifying heating operation of the air conditioner for vehicle according to the embodiment of the invention.

First, for example, in step S01 shown in FIG. 4, it is determined whether or not the dehumidifying heating operation has been instructed to start.

If the determination result is "NO", the determination process of step S01 is repeatedly executed.

On the other hand, if the determination result is "YES", proceed to step S02.

Figure 5:
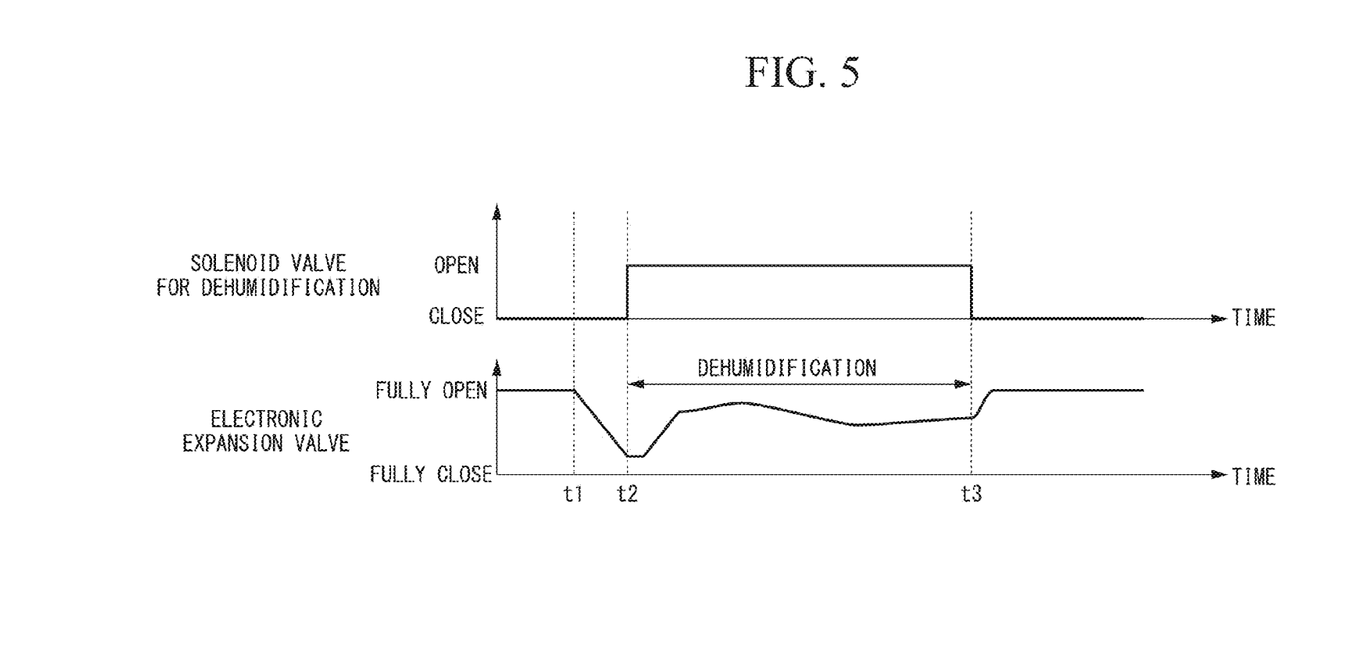
FIG. 5 shows an example of a state of a solenoid valve for dehumidification and an electronic expansion valve during the dehumidifying heating operation of the air conditioner for vehicle according to the embodiment of the invention.

Next, in step S02, the valve opening degree of the electronic expansion valve 27 is reduced to be equal to or less than a predetermined opening degree, as is the period from time t1 to time t2 shown in FIG. 5, for example.

Furthermore, the predetermined opening degree is the valve opening degree where, when the solenoid valve for dehumidification 28 is switched from the closed state to the opened state thereafter, the flowing sound of the heat-exchange medium which passes through the electronic expansion valve 27 and flows in the evaporator 14 is less than a predetermined volume (volume perceptible by an occupant in the vehicle cabin, for example).

Subsequently, in step S03, the solenoid valve for dehumidification 28 is switched from the closed state to the opened state, as is time t2 shown in FIG. 5, for example.

Next, in step S04, for example, based on a command signal input by an operator via an appropriate switch (not shown) or the like or a signal of detection results output from the evaporator sensor 19, for example, the valve opening degree of the electronic expansion valve 27 is controlled in order to ensure a desired dehumidification effect in the evaporator 14.

Thereby, the valve opening degree of the electronic expansion valve 27 is gradually increased since time t2, namely the valve opening degree of the electronic expansion valve 27 is increased more than the predetermined opening degree, as is the period from time t2 to time t3 shown in FIG. 5, for example. Thereby, the dehumidifying heating operation is in the execution state.

Next, in step S05, it is determined whether or not the dehumidifying heating operation is instructed to end.

If the determination result is "NO", the process returns to step S04 described above.

However, if the determination result is "YES", the process proceeds to step S06.

In step S06, the solenoid valve for dehumidification 28 is switched from the opened state to the closed state, as is time t3 shown in FIG. 5, for example, and then the process ends.

As described above, in the air conditioner for vehicle 10 according the embodiment, in the heat pump cycle 17 where the exterior heat-exchanger 24 and the evaporator (interior heat-exchanger) 14 are connected in parallel between the interior condenser 16 and the compressor 21, when, during the dehumidifying heating operation, the heat-exchange medium flowing out from the interior condenser 16 is branched into and circulated through the exterior heat-exchanger 24 and the evaporator 14, it is possible to prevent the heat-exchange medium flowing out from the interior condenser 16 from rapidly flowing into the evaporator 14 after being circulated through the solenoid valve for dehumidification 28 and the electronic expansion valve 27.

Thereby, it is possible to suppress an increase in the flowing sound of the heat-exchange medium in the evaporator 14 and to appropriately switch the operation from the operation (heating operation or cooling operation, for example) where the solenoid valve for dehumidification 28 is in the closed state to the dehumidifying heating operation where the solenoid valve for dehumidification 28 is in the opened state.

In the above-described embodiment, when the execution of the dehumidifying heating operation is started, the valve opening degree of the electronic expansion valve 27 is reduced to be equal to or less than the predetermined opening degree before the solenoid valve for dehumidification 28 is switched from the closed state to the opened state. However, without being limited thereto, for example, in the cooling operation, the dehumidifying heating operation or the like, when the execution is started and a temperature control is executed to maintain the temperature of the evaporator 14 such that the evaporator 14 is not frozen through adjusting the flow rate of the heat-exchange medium flowing in the evaporator 14, the increase in the flowing sound of the heat-exchange medium in the evaporator 14 may be suppressed by adjusting the flow rate of the heat-exchange medium flowing in the evaporator 14 by repeatedly changing the valve opening degree of the electronic expansion valve 27 between the open side and the close side while the solenoid valve for dehumidification 28 is in the opened state.

In other words, in the temperature control, if the solenoid valve for dehumidification 28 is controlled to be opened or closed in a state where the valve opening degree of the electronic expansion valve 27 is greater than the predetermined opening degree, for example, there is a possibility that the heat-exchange medium may rapidly flow into the evaporator 14.

On the other hand, as in the above-described embodiment, the valve opening degree of the electronic expansion valve 27 is reduced to be equal to or less than the predetermined opening degree before the solenoid valve for dehumidification 28 is changed from the closed state to the opened state, the solenoid valve for dehumidification 28 is opened after the valve opening degree of the electronic expansion valve 27 is reduced to be equal to or less than the predetermined opening degree, and the valve opening degree of the electronic expansion valve 27 is repeatedly changed between the open side and close side after the solenoid valve for dehumidification 28 is opened. In this manner, it is possible to prevent the heat-exchange medium from rapidly flowing into the evaporator 14.

What is claimed is:

1. An air conditioner for vehicle comprising:
    a compressor that compresses and outputs a heat-exchange medium;
    an interior condenser that is able to radiate heat using the heat-exchange medium which is output from the compressor after being compressed;
    an exterior heat-exchanger that exchanges heat between the heat-exchange medium flowing out from the interior condenser and an atmosphere outside of a vehicle cabin;
    an electronic expansion valve that decompresses, expands and outputs the heat-exchange medium;
    an interior heat-exchanger that exchanges heat between the heat-exchange medium, which is output from the electronic expansion valve after being decompressed and expanded, and an atmosphere inside of the vehicle cabin;
    a first flow passage that connects the interior condenser and the exterior heat-exchanger;
    a second flow passage that is branched from the first flow passage and connected to the electronic expansion valve;
    a solenoid valve for dehumidification that is provided in the second flow passage and controlled to be opened or closed; and
    a control device that controls a valve opening degree of the electronic expansion valve and for controlling opening or closing of the solenoid valve for dehumidification,
    wherein, when an operation is switched from an operation where the solenoid valve for dehumidification is in a closed state to a dehumidifying heating operation where the solenoid valve for dehumidification is in an opened state, the dehumidifying heating operation being performed by the heat exchange medium flowing out from the interior condenser is branched into and circulated through the exterior heat-exchanger and then into the interior heat-exchanger;
    wherein the control device decreases the valve opening degree of the electronic expansion valve to be equal to or less than a predetermined opening degree, but not closed, before opening the solenoid valve for dehumidification from the closed state, and then opens the solenoid valve for dehumidification, and after opening the solenoid valve for dehumidification, then increases the valve opening degree of the electronic expansion valve to be greater than the predetermined opening degree, and a flowing sound of the heat-exchange medium is less than a predetermined volume.

2. An air conditioner for vehicle comprising:
    a compressor that compresses and outputs a heat-exchange medium;
    an interior condenser that is able to radiate heat using the heat-exchange medium which is output from the compressor after being compressed;
    an exterior heat-exchanger that exchanges heat between the heat-exchange medium flowing out from the interior condenser and an atmosphere outside of a vehicle cabin;
    an electronic expansion valve that decompresses, expands and outputs the heat-exchange medium;
    an interior heat-exchanger that exchanges heat between the heat-exchange medium, which is output from the electronic expansion valve after being decompressed and expanded, and an atmosphere inside of the vehicle cabin, wherein the exterior heat exchanger and the interior heat exchanger are connected in parallel;
    a first flow passage that connects the interior condenser and the exterior heat-exchanger;
    a second flow passage that is branched from the first flow passage and connected to the electronic expansion valve;
    a solenoid valve for dehumidification that is provided in the second flow passage and controlled to be opened or closed; and
    a control device that controls a valve opening degree of the electronic expansion valve and for controlling opening or closing of the solenoid valve for dehumidification,
    (a) wherein, when an operation is switched from an operation where the solenoid valve for dehumidification is in a closed state to a dehumidifying heating operation where the solenoid valve for dehumidification is in an opened state, the dehumidifying heating operation being performed by the heat exchange medium flowing out from the interior condenser is branched into and circulated through the exterior heat-exchanger and then into the interior heat-exchanger;
    wherein the control device decreases the valve opening degree of the electronic expansion valve to be equal to or less than a predetermined opening degree, but not closed, before opening the solenoid valve for dehumidification from the closed state, and then opens the solenoid valve for dehumidification, and after opening the solenoid valve for dehumidification, then increases the valve opening degree of the electronic expansion valve to be greater than the predetermined opening degree, and a flowing sound of the heat-exchange medium is less than a predetermined volume.

* * * * *